United States Patent
Kochura et al.

(10) Patent No.: US 10,169,649 B2
(45) Date of Patent: Jan. 1, 2019

(54) SMART IMAGE FILTERING METHOD WITH DOMAIN RULES APPLICATION

(71) Applicant: International Business Machines Corporation, Armonk, NY (US)

(72) Inventors: Nadiya Kochura, Bolton, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 15/221,718

(22) Filed: Jul. 28, 2016

(65) Prior Publication Data

US 2018/0032803 A1     Feb. 1, 2018

(51) Int. Cl.
G06K 9/00     (2006.01)
G06K 9/62     (2006.01)

(52) U.S. Cl.
CPC ....... G06K 9/00442 (2013.01); G06K 9/6267 (2013.01)

(58) Field of Classification Search
CPC .......................... G06K 9/6267; G06K 9/00442
See application file for complete search history.

(56) References Cited

U.S. PATENT DOCUMENTS

| | | | | |
|---|---|---|---|---|
| 5,631,970 | A * | 5/1997 | Hsu | G06K 9/00476 345/61 |
| 6,470,306 | B1 * | 10/2002 | Pringle | G06F 17/241 704/3 |
| 6,720,880 | B2 | 4/2004 | Gutta et al. | |
| 8,184,018 | B2 | 5/2012 | Chen et al. | |
| 8,380,725 | B2 | 2/2013 | Borst et al. | |
| 8,503,800 | B2 * | 8/2013 | Blonk | G06K 9/00261 382/224 |

(Continued)

FOREIGN PATENT DOCUMENTS

CN     102106719 B     9/2013

OTHER PUBLICATIONS

Geman, Donald et al., "Visual Turing test for computer vision systems", PNAS, vol. 112, No. 12, pp. 3618-3623, Mar. 2015.

(Continued)

*Primary Examiner* — Mia M Thomas
(74) *Attorney, Agent, or Firm* — North Shore Patents, P.C.; Michele Liu Baillie

(57) ABSTRACT

An image filtering system for compliance assessment is built and modified dynamically. The system defines a vocabulary for a domain by extracting entities from corpus documents and grouping entities into image categories. An image catalog is built by identifying objects in images from a system image catalog and associating the objects with entities in the image categories. Compliance rules are generated by identifying and using image categories related to topics in corpus data sources. An image classification pipeline is then trained to classify images according to the compliance rules until performance metrics are met. The training process may be repeated to extract new and updated knowledge in corpus document and/or corpus data sources. For compliance assessment of an image, entities in related image categories are identified. The image is then classified according to actions associated with any applicable compliance rules.

20 Claims, 5 Drawing Sheets

(56) References Cited

U.S. PATENT DOCUMENTS

| | | | |
|---|---|---|---|
| 8,593,542 B2* | 11/2013 | Steinberg | G06K 9/036 348/239 |
| 8,670,597 B2* | 3/2014 | Petrou | G06F 17/30256 382/100 |
| 8,678,851 B2 | 3/2014 | Yoshida et al. | |
| 8,705,887 B2 | 4/2014 | Ma et al. | |
| 8,731,242 B2 | 5/2014 | Vogelmann | |
| 8,745,068 B2 | 6/2014 | Colombino et al. | |
| 8,793,724 B2 | 7/2014 | Robinson | |
| 8,855,372 B2* | 10/2014 | Rodriguez | G06F 17/30265 348/169 |
| 8,873,813 B2* | 10/2014 | Tadayon | G06K 9/00 382/118 |
| 9,311,531 B2* | 4/2016 | Amtrup | G06K 9/00442 |
| 9,684,951 B2* | 6/2017 | Wohlberg | G06T 5/001 |
| 9,916,538 B2* | 3/2018 | Zadeh | G06K 9/627 |
| 10,055,672 B2* | 8/2018 | Shoaib | G06K 9/6267 |
| 2008/0131004 A1 | 6/2008 | Farmer et al. | |
| 2011/0130114 A1 | 6/2011 | Boudville | |
| 2012/0065924 A1* | 3/2012 | Nielsen | G01J 3/0264 702/135 |
| 2012/0229624 A1 | 9/2012 | Calman et al. | |
| 2013/0282609 A1 | 10/2013 | Au et al. | |
| 2014/0010464 A1* | 1/2014 | Umeda | G06K 9/6267 382/224 |
| 2015/0023552 A1 | 1/2015 | Rosen | |
| 2015/0131896 A1 | 5/2015 | Hu et al. | |
| 2015/0154465 A1* | 6/2015 | Gueguen | G06K 9/4676 382/195 |
| 2015/0170526 A1* | 6/2015 | Wang | B64C 19/00 701/16 |
| 2015/0211870 A1 | 7/2015 | Nickolaou | |
| 2015/0371097 A1 | 12/2015 | Park et al. | |
| 2016/0068156 A1 | 3/2016 | Horii | |
| 2016/0110632 A1* | 4/2016 | Kiraly | G06K 9/66 382/128 |
| 2016/0225053 A1* | 8/2016 | Romley | G06T 7/11 |
| 2016/0307073 A1* | 10/2016 | Moody | G06K 9/0063 |
| 2017/0075872 A1* | 3/2017 | Tong | G06F 17/2765 |
| 2017/0098122 A1* | 4/2017 | el Kaliouby | A61B 5/744 |
| 2017/0213109 A1* | 7/2017 | Moody | G06K 9/6267 |

OTHER PUBLICATIONS

Silva et al., "Helmet Detection On Motorcyclists Using Image Descriptors and Classifiers", 2014 27th SIBGRAPI Conference on Graphics, Patterns and Images, pp. 141-148, Aug. 2014.

Takemura et al., "Embedded Image Recognition Systems for Advanced Safety Vehicles", 2015 Symposium on VLSI Circuits (VLSI Circuits), pp. C146-C147, Jun. 2015.

\* cited by examiner

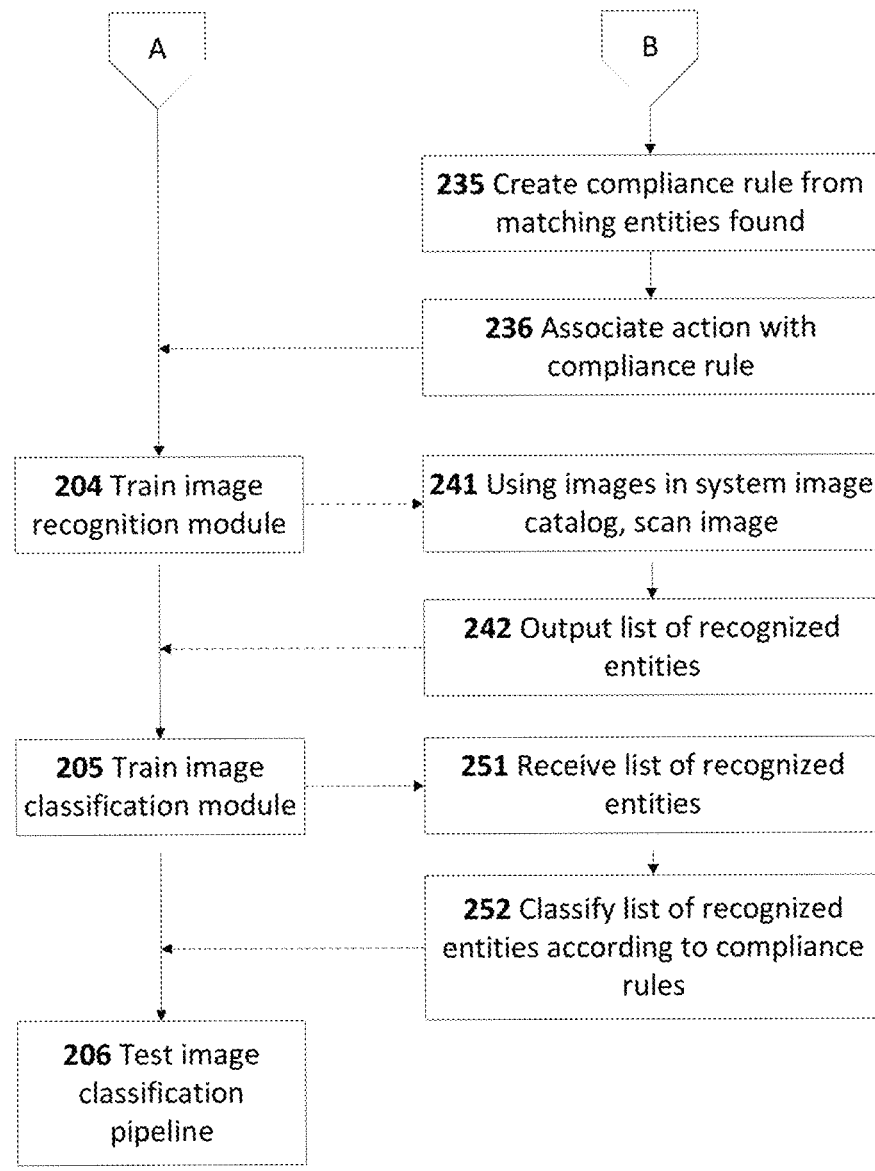
FIG. 2 (con't)

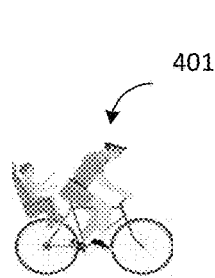
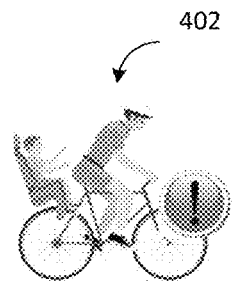
FIG. 4A  FIG. 4B
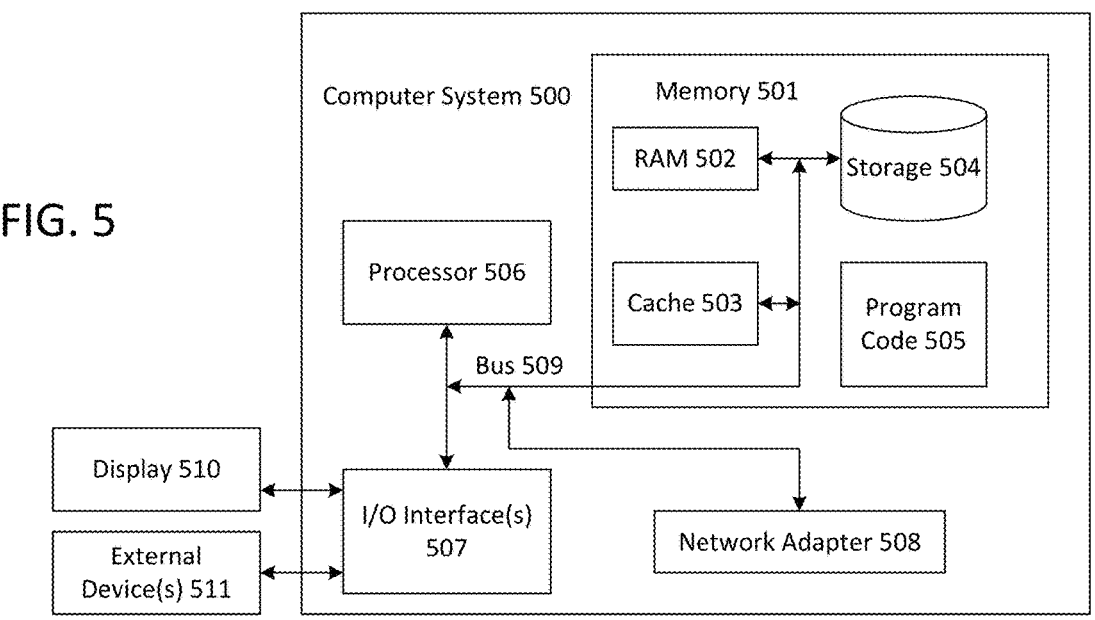
FIG. 5

SMART IMAGE FILTERING METHOD WITH DOMAIN RULES APPLICATION

BACKGROUND

Studies have shown that repeated exposure to images in advertisements and other media changes are capable of changing people's behavior related to health and safety decision making. However, not all images depict behavior consistent with recommended health and safety practices. For example, images may depict inappropriate use of medications for unsafe age groups or medications that have not been approved for use in children by the U.S. Food and Drug Administration (FDA). For another example, images may depict children riding bicycles without helmets, people not wearing life vests while in a boat or on the water, or toddlers eating foods for which the American Academy of Pediatrics (AAP) has age-specific anti-choking guidelines. There is thus a concern that repeated exposure to such images may falsely lead consumers to believe that the unsafe or unhealthy practice depicted are safe or healthy.

SUMMARY

Disclosed herein is a method for image filtering and a computer program product as specified in the independent claims. Embodiments of the present invention are given in the dependent claims. Embodiments of the present invention can be freely combined with each other if they are not mutually exclusive.

According to an embodiment of the present invention, in a method for image filtering, a vocabulary for a given domain is defined by extracting a set of entities from a set of corpus documents related to the given domain and grouping the set of entities into a set of image categories based on probabilities of co-occurrence of the set of entities. An image catalog is built by identifying one or more objects in one or more images from the image catalog and associating the objects with the set of entities in the set of image categories. A set of compliance rules is generated by identifying one or more image categories related to topics in corpus data sources and generating the set of compliance rules, using the one or more image categories related to the topics. An image classification pipeline is then trained by identifying one or more entities in a given image, classifying the given image according to one or more of the set of compliance rules, and repeating the identifying of the one or more entities in the given image and the classifying of additional images until a set of performance metrics are met.

In one aspect of the present invention, when the image filtering system receives a second given image for compliance assessment, related image categories from the set of image categories are identified using image metadata of the second given image and one or more entities in the second given image matching entities in the related image categories are identified. A list of the entities found in the second given image is created, and it is determined whether any of the set of compliance rules apply to the list of the entities found in the second given image. The second given image is then classified according to an action associated with each applicable compliance rule. The action associated with each applicable compliance rule may then be performed.

Embodiments of the image filtering system according to the present invention are built and modified dynamically. The training process may be repeated to extract new and updated knowledge in corpus document and/or corpus data sources, and to apply the new and updated knowledge to the domain vocabularies, system image catalog, and compliance rules. The image filtering system also has the ability to accommodate multiple domains and need not be limited to any single set of domains. The system further may be configured to accept runtime feedback on the accuracy of the classification, and in response, adjust and improve the performance by adding additional compliance rules, enhancing existing compliance rules, and/or updating the image catalog entries.

BRIEF DESCRIPTION OF THE DRAWINGS

FIGS. 4A-4B illustrate example altered images by the image filtering system.

FIG. 5 illustrates an exemplary computer system for implementing embodiments of the present invention.

DETAILED DESCRIPTION

Embodiments of the present invention provide an image filtering system that analyzes images for their consistency with known health and safety regulations, recommendations, or guidelines. At a learning phase, the system is pre-trained using a dynamically generated set of compliance rules for a given domain. At run time, the system processes images and classifies them with various levels of compliance, as defined by the compliance rules. Depending on the compliance level, the system may alter the image with alerts, warnings, reminders, or other tags.

Figure 1:
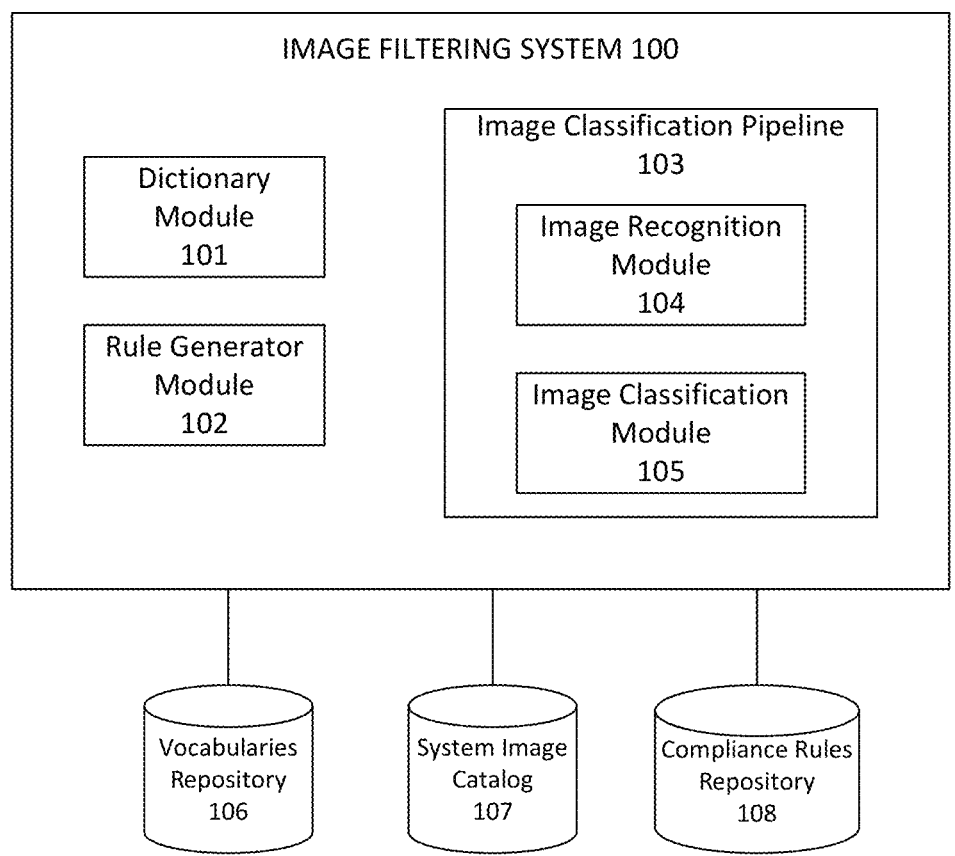
FIG. 1 illustrates an embodiment of an image filtering system according to the present invention.

FIG. 1 illustrates an embodiment of an image filtering system according to the present invention. The image filtering system 100 comprises a dictionary module 101 for building domain vocabularies, a rule generator module 102 for building compliance rules, and an image classification pipeline 103 comprising an image recognition module 104 and an image classification module 105. The image recognition module 104 processes images to detect entities or objects depicted in the image that match entities in related image categories. The image classification module 105 processes the detected entities to classify the image according to the compliance rules. The system 100 is configured with access to a vocabularies repository 106, a system image catalog 107, and a compliance rules repository 108, as described further below.

Figure 2:
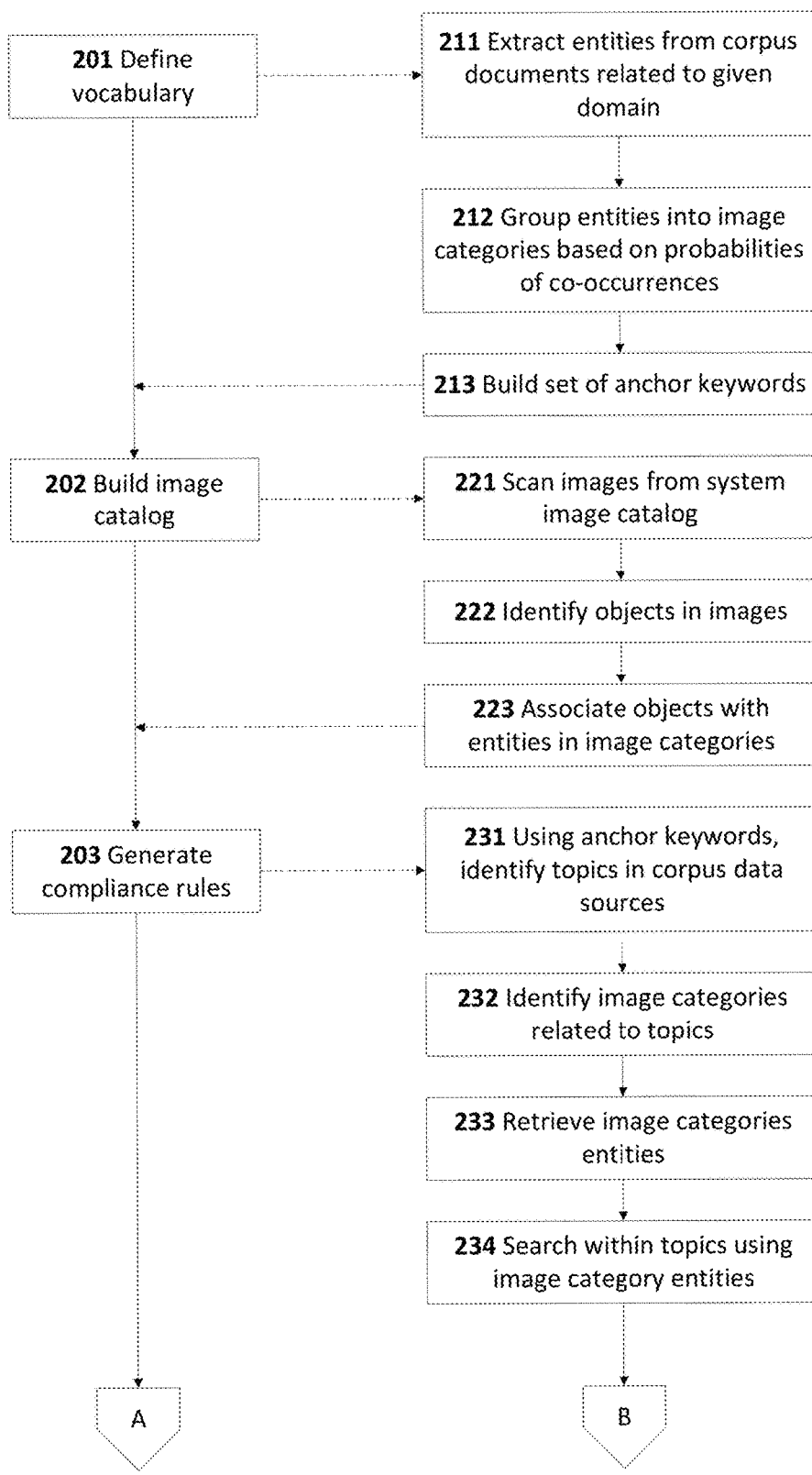
FIG. 2 illustrates an embodiment of a method for training the image filtering system according to the present invention.

At a learning stage, prior to runtime assessment of images for compliance, the various components of the system 100 are configured and trained. FIG. 2 illustrates an embodiment of a method for training the image filtering system according to the present invention. First, the vocabulary is defined by the vocabulary module 101 (201). In defining the vocabulary, the vocabulary module 101 extracts entities or objects from corpus documents related to a given domain (211). In this illustrative embodiment, the entities are presented as words and n-grams. The extraction of entities may be automated and performed without user intervention. The entities are grouped into one or more image categories based on probabilities of their co-occurrence in the corpus documents (212). In addition, dictionary module 101 builds a set of "anchor" keywords (213), used for locating topics by the rules generator module 102, as described further below.

Next, the image catalog is built (202). The image recognition module 104 scans images in the system image catalog 107 (221), identifies the objects in the images (222) using various image recognition techniques, and associates the objects with entities in the domain vocabulary (223). In this manner, the image catalog entities and the domain vocabulary are synchronized, where domain vocabulary entities have corresponding image representations in the image catalog. Image catalog entries can be pre-built by processing annotated images marked as non-safe or non-healthy and used to train the image recognition module 104.

The rule generator module 102 generates compliance rules (203). Using the anchor keywords built by the dictionary module 101, the rule generator module 102 identifies topics in corpus data sources (231). The corpus data sources may include FDA regulations, AAP papers and research, and other trusted sources of information. In the illustrative embodiment, the rule generator module 102 uses natural language processing techniques for processing the corpus data and identifying topics. From the topic's context, the rule generator module 102 identifies one or more image categories related to the topics (232), and retrieves the image category entities from the vocabularies repository 106 (233). The rule generator module 102 then searches the corpus data sources within the topics using the image category entities (234). The rule generator module 102 creates one or more compliance rules from the matching entities found (235) and associates an action with each compliance rule (236). The compliance rules are stored in the compliance rules repository 108.

During the learning stage, the image recognition module 104 and the train image classification module 105 are trained (204-205). To train the image recognition module 104, the images in the system image catalog 107 are used. The image recognition module 104 scans the images (241), performs an image recognition process, and outputs a list of recognized entities (242). The image classification module 105 receives the list of recognized entities from the image recognition module 104 (251) and classifies the list of entities according to the compliance rules in the compliance rules repository 108 (252). The image classification module 105 compares the list of recognized entities with the entities in the compliance rules and determines whether any of the compliance rules apply based on the comparison. For any compliance rules that apply, the image is classified according to an action associated with the applicable compliance rule. The image classification pipeline 103 can then be tested (206), and the performance of the pipeline 103 can be improved by adding conditions to the compliance rules and/or by adding images to the system image catalog 107 if needed. Multiple iterations of the training and/or testing may be performed until a desired accuracy and other performance metrics are achieved and confirmed.

Figure 3:
FIG. 3 illustrates an embodiment of a method for image filtering according to the present invention.

FIG. 3 illustrates an embodiment of a method for image filtering according to the present invention. During runtime, the image filtering system 100 receives an image for compliance assessment (301). For example, an application at a client computing device may extract an image and send a request for the compliance assessment to the system 100 over a data network. The request would include the extracted image, image metadata, and any other data relevant to the compliance assessment process. The system 100 uses the image metadata to identify one or more related image categories (302) in order to increase the efficiency of filtering process. Image metadata may include the source of the image (such as a magazine title, website link, etc.), text extracted from the image itself or from the image title, and any other similar metadata. The image recognition module 104 scans the image, identifies entities in the image matching entities in the one or more related image categories (303), and creates a list of the entities found in the image (304). The image classifier module 105 receives the list of entities from the image recognition module 104, determines whether any compliance rules apply (305), and classifies the image according to the action(s) associated with the applicable compliance rule(s) (306). The system 100 then performs the action(s) associated with the classification (307), such as altering the image with a warning or adding a reminder tag to the image.

The image filtering system 100 is built and modified dynamically. The training process described above with reference to FIG. 2 may be repeated to extract new and updated knowledge in corpus document and/or corpus data sources, and to apply the new and updated knowledge to the domain vocabularies, system image catalog, and compliance rules. The image filtering system 100 also has the ability to accommodate multiple domains and need not be limited to any single set of domains. The system 100 further may be configured to accept runtime feedback on the accuracy of the classification, and in response, adjust and improve the performance by adding additional compliance rules, enhancing existing compliance rules, and/or updating the image catalog entries.

For example, with reference to FIG. 2, in defining the vocabulary (201), assume that for a given domain, the following entities are extracted from corpus documents related to the given domain (211):

V_domain={car, children(child), car seat, baby, bicycle, trampoline, helmet, safety belt, smoke, . . . }

These entities are grouped to form two image categories based on their probabilities of co-occurrence (212):

V_sport={children(child), bicycle, trampoline, helmet, . . . }

V_car={safety belt, smoke, children(child), car, car seat, baby, . . . }

Assume also that the following anchor keywords are built (213):

V_anchor={non-safe, reported dangerous, health risk, pediatric recommendation, smoking, policy, law, . . . }.

The image catalog is then built (202), as described above, using the system image catalog 107. In this example, to generate the compliance rules (203), assume that the rule generator module 102 uses V_anchor to search the following example excerpt from an AAP research paper (231):

"*Parents Smoking in Their Cars with Children Present*". The majority of smoking parents exposed their children to tobacco smoke in cars. Coupled with the finding of low rates of pediatricians addressing smoking in cars, this study highlights the need for improved pediatric interventions, public health campaigns, and policies regarding smoke-free car laws to protect children from tobacco smoke."

Assume in this example, that the rule generator module 102 identifies the bolded topics. The rule generator module 102 identifies the V_car image category as being related to the topics (232) and retrieves the V_car image category entities (233). The rule generator module 102 searches within the example excerpt above and finds the following matching entities, {car, children, smoke} (234). Using natural language processing and the topic context, the rule generator module 102 creates a compliance rule={car=yes, children=yes, smoke=yes, level=alert}, from the matching entities found (235). Due to the keyword "law" found in the excerpt, the compliance rule is associated with the highest level of compliance, "alert" (236). A unique ID is assigned to the compliance rule, and the compliance rule is stored in the compliance rules repository 108. The actual semantics used for the compliance rules may vary depending on the selected rule engine or rule grammar.

During the training of the image recognition module 104 (204), assume that the image recognition module 104 outputs a list of entities including {car, kid on bicycle} (241-242). During the training of the image classification module 105, the image classification module 105 receives the list of entities (251). Assume that the image classification module 105 determines that a compliance rule, {helmet=no, car=yes, child on bicycle=yes, level=alert}, applies since a car and a child on a bicycle are recognized in the image but the image fails to depict a helmet. In response, the image classification module 105 classifies the image as an "alert" according to the compliance rule (252).

During runtime, with reference to FIG. 3, assume that the image 401 illustrated in FIG. 4A is received for compliance assessment (301). Assume the metadata for the image 401 identifies the source image as "All about kids for Parents" magazine in the sport section. The scope of related image categories may then be narrowed to sports and kids (302). Assume that V_sport is one of the related image categories. Using the entities in V_sport, the image recognition module 104 identifies the matching entities in the image 401 (303) and creates the following list (304):

{child=1, bicycle=1, helmet=0}, where '1' indicates that the entity is found and '0' indicates the entity is not found in the image 401.

The image classification module 105 receives the list and determines that a compliance rule, {child=1, bicycle=1, helmet=0, level=alert} applies (305). In response, the image classification module 105 classifies the image 401 as "alert" (306). In this example, assume that an "alert" action indicates that a graphic is to be added to the image 401. In response, the system 100 adds the graphic to the image 401 (307), resulting in image 402 illustrated in FIG. 4B. The altered image 402 is then returned by the system 100 as a result of the compliance assessment.

FIG. 5 illustrates an exemplary computer system for implementing embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for building computing components of an image filtering system prior to a runtime assessment of images for compliance by the image filtering system, comprising:
    defining, by the image filtering system, a vocabulary for a given domain, comprising:
        extracting a set of entities from a set of corpus documents related to the given domain; and
        grouping the set of entities into a set of image categories based on probabilities of co-occurrence of the set of entities;
    building, by the image filtering system, an image catalog, comprising:
        identifying one or more objects in one or more images from the image catalog; and
        associating the one or more objects with the set of entities in the set of image categories;
    generating, by the image filtering system, a set of compliance rules, comprising:
        identifying a given image category of the set of image categories that relate to topics in corpus data sources; and
        generating the set of compliance rules, using the set of entities grouped in the given image category; and
    training, by the image filtering system, an image classification pipeline, comprising:
        identifying one or more entities in a given image of the one or more images from the image catalog;
        classifying the given image according to one or more of the set of compliance rules; and
        repeating the identifying of the one or more entities in the given image and the classifying of additional images until a set of performance metrics are met.

2. The method of claim 1, further comprising:
    repeating the defining of the vocabulary, the building of the image catalog, the generating of the set of compliance rules, and the training of the image classification pipeline to incorporate new or updated corpus documents or corpus data sources.

3. The method of claim 1, wherein the defining of the vocabulary for the given domain further comprises building a set of anchor keywords,
    wherein the identifying of the image categories related to the topics in the corpus data sources comprises identifying the topics in the corpus data sources using the set of anchor keywords.

4. The method of claim 1, wherein the generating of the set of compliance rules using the one or more image categories related to the topics comprises:
    retrieving the set of entities grouped in the given image category;
    searching within the topics using the set of entities grouped in the given image category;
    creating a given compliance rule of the set of compliance rules using entities found in the corpus data sources matching the set of entities grouped in the given image category; and
    associating an action with the given compliance rule.

5. The method of claim 1, wherein the classifying of the given image according to one or more of the set of compliance rules comprises:
    comparing the one or more entities in the given image with entities in the set of compliance rules;
    determining whether any of the set of compliance rules apply to the given image based on the comparison; and classifying the given image based on an action associated with each applicable compliance rule.

6. The method of claim 1, further comprising:
receiving a second given image for compliance assessment;
identifying related image categories from the set of image categories using image metadata of the second given image;
identifying one or more entities in the second given image matching entities in the related image categories;
creating a list of the entities found in the second given image;
determining whether any of the set of compliance rules apply to the list of the entities found in the second given image;
classifying the second given image according to an action associated with each applicable compliance rule; and
performing the action associated with each applicable compliance rule.

7. The method of claim 6, wherein the performing of the action associated with each applicable compliance rule comprises:
altering the second given image based on the action; and
returning the altered second given image as a result of the compliance assessment.

8. A computer program product for building computing components of an image filtering system prior to a runtime assessment of images for compliance by the image filtering system, the computer program product comprising a computer readable storage medium having program instructions embodied therewith, the program instructions executable by a processor to cause the processor to:
define a vocabulary for a given domain, comprising:
extracting a set of entities from a set of corpus documents related to the given domain; and
grouping the set of entities into a set of image categories based on probabilities of co-occurrence of the set of entities;
build an image catalog, comprising:
identifying one or more objects in one or more images from the image catalog; and
associating the one or more objects with the set of entities in the set of image categories;
generate a set of compliance rules, comprising:
identifying a given image category of the set of image categories that relating to topics in corpus data sources; and
generating the set of compliance rules, using the set of entities grouped in the given image category; and
train an image classification pipeline, comprising:
identifying one or more entities in a given image of the one or more images from the image catalog;
classifying the given image according to one or more of the set of compliance rules; and
repeating the identifying of the one or more entities in the given image and the classifying of additional images until a set of performance metrics are met.

9. The computer program product of claim 8, further cause the processor to:
repeat the defining of the vocabulary, the building of the image catalog, the generating of the set of compliance rules, and the training of the image classification pipeline to incorporate new or updated corpus documents or corpus data sources.

10. The computer program product of claim 8, wherein the defining of the vocabulary for the given domain further comprises building a set of anchor keywords, wherein the identifying of the image categories related to the topics in the corpus data sources comprises identifying the topics in the corpus data sources using the set of anchor keywords.

11. The computer program product of claim 8, wherein the generating of the set of compliance rules using the one or more image categories related to the topics comprises:
retrieve the set of entities grouped in the given image category;
search within the topics using the set of entities grouped in the given image category;
create a given compliance rule of the set of compliance rules using entities found in the corpus data sources matching the set of entities grouped in the given image category; and
associate an action with the given compliance rule.

12. The computer program product of claim 8, wherein the classifying of the given image according to one or more of the set of compliance rules comprises:
compare the one or more entities in the given image with entities in the set of compliance rules;
determine whether any of the set of compliance rules apply to the given image based on the comparison; and
classify the given image based on an action associated with each applicable compliance rule.

13. The computer program product of claim 8, further causing the processor to:
receive a second given image for compliance assessment;
identify related image categories from the set of image categories using image metadata of the second given image;
identify one or more entities in the second given image matching entities in the related image categories;
create a list of the entities found in the second given image;
determine whether any of the set of compliance rules apply to the list of the entities found in the second given image;
classify the second given image according to an action associated with each applicable compliance rule; and
perform the action associated with each applicable compliance rule.

14. The computer program product of claim 13, wherein the performing of the action associated with each applicable compliance rule comprises:
alter the second given image based on the action; and
return the altered second given image as a result of the compliance assessment.

15. An image filtering system, comprising:
a processor; and
a computer readable storage medium having program instructions embodied therewith for building computing components of the image filtering system prior to a runtime assessment of images for compliance by the image filtering system, the program instructions executable by the processor to cause the processor to:
define a vocabulary for a given domain, comprising:
extracting a set of entities from a set of corpus documents related to the given domain; and
grouping the set of entities into a set of image categories based on probabilities of co-occurrence of the set of entities;
build an image catalog, comprising:
identifying one or more objects in one or more images from the image catalog; and
associating the one or more objects with the set of entities in the set of image categories;

generate a set of compliance rules, comprising:
  identifying a given image category of the set of image categories that relate to topics in corpus data sources; and
  generating the set of compliance rules, using the set of entities grouped in the given image category; and
train an image classification pipeline, comprising:
  identifying one or more entities in a given image of the one or more images from the image catalog;
  classifying the given image according to one or more of the set of compliance rules; and
  repeating the identifying of the one or more entities in the given image and the classifying of additional images until a set of performance metrics are met.

16. The system of claim 15, further cause the processor to:
repeat the defining of the vocabulary, the building of the image catalog, the generating of the set of compliance rules, and the training of the image classification pipeline to incorporate new or updated corpus documents or corpus data sources.

17. The system of claim 15, wherein the generating of the set of compliance rules using the one or more image categories related to the topics comprises:
  retrieve the set of entities grouped in the given image category;
  search within the topics using the set of entities grouped in the given image category;
  create a given compliance rule of the set of compliance rules using entities found in the corpus data sources matching the set of entities grouped in the given image category; and
  associate an action with the given compliance rule.

18. The system of claim 15, wherein the classifying of the given image according to one or more of the set of compliance rules comprises:
  compare the one or more entities in the given image with entities in the set of compliance rules;
  determine whether any of the set of compliance rules apply to the given image based on the comparison; and
  classify the given image based on an action associated with each applicable compliance rule.

19. The system of claim 15, further causing the processor to:
  receive a second given image for compliance assessment;
  identify related image categories from the set of image categories using image metadata of the second given image;
  identify one or more entities in the second given image matching entities in the related image categories;
  create a list of the entities found in the second given image;
  determine whether any of the set of compliance rules apply to the list of the entities found in the second given image;
  classify the second given image according to an action associated with each applicable compliance rule; and
  perform the action associated with each applicable compliance rule.

20. The system of claim 19, wherein the performing of the action associated with each applicable compliance rule comprises:
  alter the second given image based on the action; and
  return the altered second given image as a result of the compliance assessment.

* * * * *